(12) United States Patent
Sundaram et al.

(10) Patent No.: US 8,151,026 B2
(45) Date of Patent: Apr. 3, 2012

(54) METHOD AND SYSTEM FOR SECURE COMMUNICATION BETWEEN PROCESSOR PARTITIONS

(75) Inventors: Anand Sundaram, Fremont, CA (US); Johan Fornaeus, Alameda, CA (US)

(73) Assignee: Wind River Systems, Inc., Alameda, CA (US)

( * ) Notice: Subject to any disclaimer, the term of this patent is extended or adjusted under 35 U.S.C. 154(b) by 0 days.

(21) Appl. No.: 12/872,716

(22) Filed: Aug. 31, 2010

(65) Prior Publication Data

US 2010/0333112 A1 Dec. 30, 2010

Related U.S. Application Data

(63) Continuation of application No. 12/164,678, filed on Jun. 30, 2008, now Pat. No. 7,809,875.

(51) Int. Cl.
*G06F 13/00* (2006.01)
*G06F 9/455* (2006.01)
*G06F 21/00* (2006.01)

(52) U.S. Cl. ........ 710/260; 710/263; 709/213; 709/214; 709/215; 709/216; 711/147; 711/148; 711/149; 711/150; 711/151; 718/1; 718/100; 719/313

(58) Field of Classification Search .......... 709/213–216; 711/147–153; 718/1, 100; 719/313
See application file for complete search history.

(56) References Cited

U.S. PATENT DOCUMENTS

| | | | | |
|---|---|---|---|---|
| 5,592,625 A | * | 1/1997 | Sandberg | 711/147 |
| 5,652,885 A | * | 7/1997 | Reed et al. | 713/1 |
| 5,737,605 A | * | 4/1998 | Cunningham et al. | 719/312 |
| 6,112,229 A | * | 8/2000 | Hardy et al. | 709/206 |
| 6,289,398 B1 | * | 9/2001 | Stallmo et al. | 710/5 |
| 6,539,440 B1 | * | 3/2003 | Stracovsky et al. | 710/58 |
| 6,715,059 B2 | * | 3/2004 | Miller | 711/220 |
| 6,789,156 B1 | * | 9/2004 | Waldspurger | 711/6 |
| 6,996,659 B2 | * | 2/2006 | Lupien et al. | 710/315 |
| 7,007,151 B1 | * | 2/2006 | Ely et al. | 711/202 |
| 7,158,972 B2 | * | 1/2007 | Marsland | 1/1 |
| 7,257,811 B2 | * | 8/2007 | Hunt et al. | 718/1 |
| 7,290,259 B2 | * | 10/2007 | Tanaka et al. | 718/1 |
| 7,299,384 B1 | * | 11/2007 | Rodriguez-Rivera et al. | 714/52 |
| 7,308,539 B2 | * | 12/2007 | Fuhs et al. | 711/141 |
| 7,353,319 B2 | * | 4/2008 | Speier et al. | 711/5 |
| 7,356,665 B2 | * | 4/2008 | Rawson, III | 711/202 |
| 7,380,049 B2 | * | 5/2008 | Rajagopal et al. | 711/6 |
| 7,412,492 B1 | * | 8/2008 | Waldspurger | 709/216 |
| 7,418,560 B2 | * | 8/2008 | Wintergerst | 711/147 |
| 7,454,477 B2 | * | 11/2008 | Talluri et al. | 709/213 |
| 7,478,390 B2 | * | 1/2009 | Brokenshire et al. | 718/100 |
| 7,490,324 B2 | * | 2/2009 | Shultz et al. | 718/1 |
| 7,539,841 B2 | * | 5/2009 | Rawson, III | 711/202 |
| 7,546,572 B1 | * | 6/2009 | Ballagh et al. | 716/138 |
| 7,574,709 B2 | * | 8/2009 | Erlingsson et al. | 719/310 |
| 7,584,473 B2 | * | 9/2009 | Forin et al. | 718/100 |
| 7,636,831 B1 | * | 12/2009 | Subrahmanyam et al. | 711/206 |
| 7,809,875 B2 | * | 10/2010 | Sundaram et al. | 710/260 |
| 2003/0051103 A1 | * | 3/2003 | Lardner et al. | 711/147 |

(Continued)

*Primary Examiner* — Brian Misiura

(74) *Attorney, Agent, or Firm* — Fay Kaplun & Marcin, LLP

(57) ABSTRACT

A system and method for writing, by a sender, a message into blocks of a memory space, the memory space being shared by the sender of the message and a receiver of the message, and sending, by the sender, an interrupt corresponding to the message.

20 Claims, 4 Drawing Sheets

U.S. PATENT DOCUMENTS

| | | | | |
|---|---|---|---|---|
| 2005/0114855 | A1* | 5/2005 | Baumberger | 718/1 |
| 2005/0125537 | A1* | 6/2005 | Martins et al. | 709/226 |
| 2005/0235068 | A1* | 10/2005 | Moriki et al. | 710/5 |
| 2006/0259571 | A1* | 11/2006 | Talluri et al. | 709/213 |
| 2007/0130441 | A1* | 6/2007 | Wooten | 711/203 |
| 2007/0174411 | A1* | 7/2007 | Brokenshire et al. | 709/213 |
| 2008/0034193 | A1* | 2/2008 | Day et al. | 712/244 |
| 2008/0086726 | A1* | 4/2008 | Griffith et al. | 718/1 |
| 2008/0141267 | A1* | 6/2008 | Sundaram | 718/106 |
| 2008/0320194 | A1* | 12/2008 | Vega et al. | 710/263 |
| 2009/0183180 | A1* | 7/2009 | Nelson | 719/319 |
| 2009/0327552 | A1* | 12/2009 | Sundaram et al. | 710/260 |
| 2010/0333112 | A1* | 12/2010 | Sundaram et al. | 719/313 |

* cited by examiner

METHOD AND SYSTEM FOR SECURE COMMUNICATION BETWEEN PROCESSOR PARTITIONS

PRIORITY CLAIM

This application is a Continuation application of U.S. patent application Ser. No. 12/164,678 filed Jun. 30, 2008 entitled "Method and System for Secure Communication Between Processor Partitions." The entire disclosure of this prior application is considered as being part of the disclosure of the accompanying application and hereby expressly incorporated by reference herein.

BACKGROUND

A computer processor may be required to run multiple processes on multiple partitions. In some cases, these partitions and the processes running therein may need to communicate with one another. This communication must be able to occur in a way that is secure and properly manages the status of trusted and distrusted entities.

SUMMARY OF THE INVENTION

A method for writing, by a sender, a message into blocks of a memory space that is shared by the sender of the message and a receiver of the message, and sending, by the sender, an interrupt corresponding to the message.

A system having a sending virtual board, a receiving virtual board, and a memory including a plurality of blocks, the blocks being shared by the sending virtual board and the receiving virtual board, the sending virtual board writing a message to the blocks and sending an interrupt to the receiving virtual board indicating the message has been written to the blocks.

A memory storing a set of instructions and a processor executing the instructions, the instructions being operable to write a message into blocks of a memory space shared by a sender of the message and a receiver of the message, send an interrupt corresponding to the message, designate the blocks as data blocks after the writing of the message into the blocks, send a further interrupt indicating that the message has been read from the blocks by the receiver, and designate the blocks as free blocks after the further interrupt has been sent.

DETAILED DESCRIPTION

Figure 1:
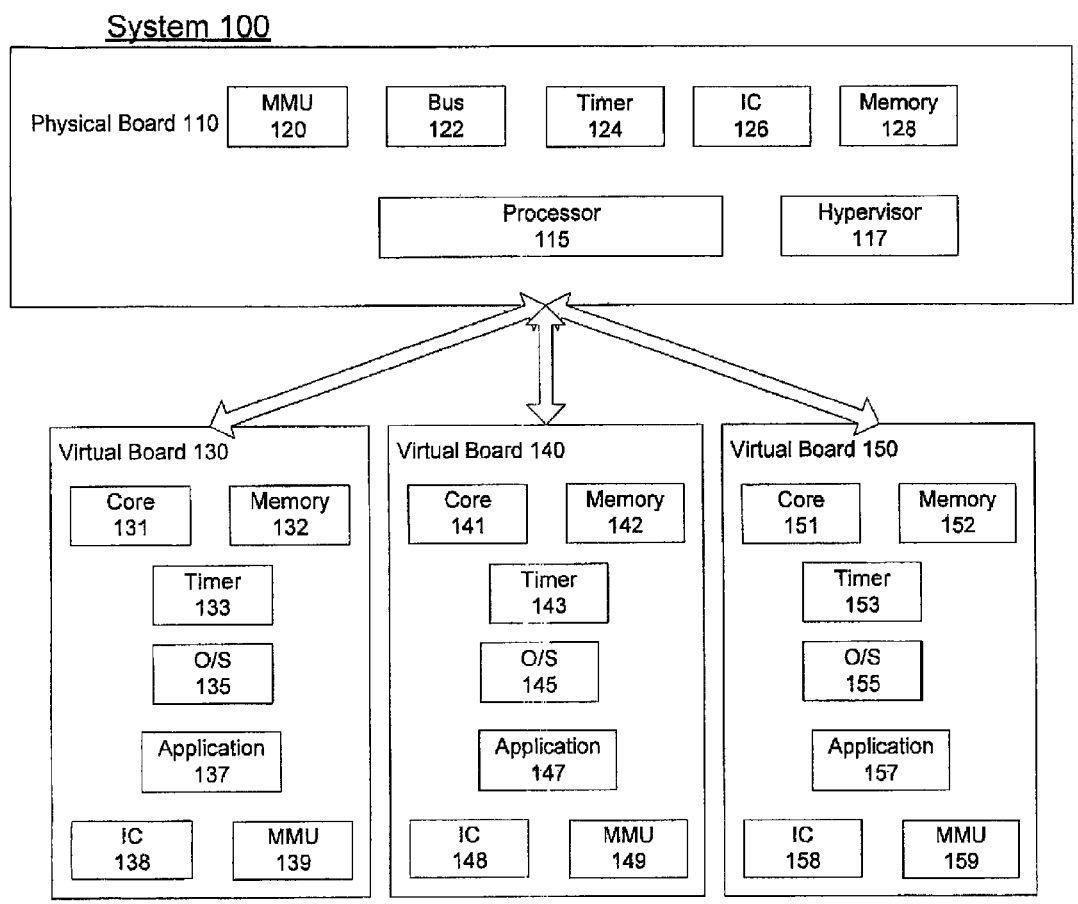
FIG. 1 shows an exemplary system for coordinating communication between virtual boards according to an exemplary embodiment of the present invention.

The exemplary embodiments of the present invention may be further understood with reference to the following description and the appended drawings, wherein like elements are referred to with the same reference numerals. The present invention describes methods and systems for facilitating communication between multiple processes running on a single processor. It should be noted that the exemplary embodiments are described with reference to virtual boards (described in detail below), but the present invention is not limited to use with virtual boards. That is, any manner or partitioning of processor time may benefit from the present invention. The partitioning of the processor time does not need to be exclusively to virtual boards, but may include any virtualization scheme used to partition a processor's time.

FIG. 1 illustrates an exemplary system 100 according to the present invention for communicating between various processing partitions. The system 100 includes a physical board 110 that includes a processor 115 which may be any type of processor capable of executing instructions contained in code, firmware, etc. A processor may concurrently execute and run multiple partitions. Those skilled in the art will understand that a processor may include multiple cores (or there may be multiple processors) that independently execute various tasks. The present invention is equally applicable to such arrangements, but for the sake of simplicity, the exemplary embodiments are described with reference to a single processor.

In addition, the physical board 110 also includes other components such as a memory management unit ("MMU") 120, a bus 122, a timer 124, an interrupt controller 126 and a memory 128. These additional components provide the physical board with various other functionalities that may be required to perform the processes and tasks required by executing software applications. Those skilled in the art will understand that components may be deleted from the physical board 110 or other components may also be included on the physical board 110, as needed. Examples of additional components may include an Ethernet interface, a serial interface, etc.

The system 100 also includes a plurality of virtual boards 130, 140 and 150. The virtual boards 130, 140, 150 each include a plurality of virtual components including, a virtual processing core 131, 141, 151, a virtual memory 132, 142, 152, a virtual timer 133, 143, 153, a virtual interrupt controller 138, 148, 158 and a virtual MMU 139, 149, 159. Each of the virtual components may be mapped to a corresponding physical component on the physical board 110. In addition, each virtual board 130, 140, 150 is running an operating system 135, 145, 155 and an application program 137, 147, 157. As shown in FIG. 1, each virtual board 130, 140 and 150 includes the same virtual components. However, those skilled in the art will understand that the virtual boards 130, 140, 150 may include any number of virtual components and the purpose of the virtual boards is to emulate an actual physical board without the developer needing the actual physical board. That is, a single physical board 110 may be used to emulate any number of other physical boards. Thus, the use of three virtual boards is also only exemplary.

In the exemplary embodiment of FIG. 1, the processor 115 is used to emulate a number of virtual processors 131, 141, 151 (also referred to herein as "partitions"), each of which may be dedicated to its own task. Those skilled in the art will understand that since the processing cores 131, 141, 151 are virtual, the information about these processors may be stored in the physical memory 128 of the physical board 110. The processor 115 may also implement software that enables the processor 115 to manage the process of switching between tasks. In this exemplary embodiment, such software is referred to as a hypervisor 117. The virtual processors 131, 141, 151 may run any of the various tasks that a computing device may need to execute (e.g., read/write operations, print operations, calculations, other processing, etc.). These virtual processors 131, 141, 151 may also share access to the other resources of the physical board 110, e.g., the MMU 120, the bus 122, the timer 124, the interrupt controller 126 and the memory 128.

It should be noted that throughout this description, it will be described that the virtual boards 130, 140, 150 gain access to the resources of the physical board 110. It should be understood that this access is transparent to the software being executed by the virtual boards 130, 140, 150. That is, the software (e.g., operating systems, applications, etc.) will understand the virtual boards 130, 140, 150 to be actual physical boards and the virtual resources of the virtual boards 130, 140, 150 to be actual resources. The software will not be aware that the physical board 110 with its resources is what is actually executing the software.

In some virtual board implementations, the virtual boards 130, 140, 150 or the tasks running therein may need to communicate with one another. Depending on the specific nature of the virtual boards and their functions, some virtual boards may be trusted, while others may be distrusted. In coordinating communications between virtual boards, there may be specific security features that may be implemented to achieve satisfactory security during such communications. Some exemplary security features are described below. However, those skilled in the art will understand that the described list is not meant to be exhaustive. That is, depending on the system and the needs of the developer, additional security features may also be implemented or that some of the security features described herein are not necessary based on individual system considerations.

A distrusted communicating entity, whether it is a sender or a receiver, should not be able to override any of the other security features, thus enabling a trusted communicating entity to fail safely due to incorrect operation of the distrusted entity. The hypervisor 117 should provide for integrity of data and virtual boards. A distrusted sender may tamper with sent data while the trusted receiver is reading the data; this threat could cause the receiver to be unable to validate the data, leading to faulty operation of the receiver due to incorrect validation. The hypervisor 117 should be able to provide for integrity against such a threat.

The hypervisor 117 should enable deterministic asynchronous communication. In other words, the sender should be able to queue messages if the receiver is not consuming the sent messages; otherwise, communication errors may occur when a distrusted receiver does not free memory space that has been used by a trusted sender to send messages. The hypervisor 117 should provide for control of access to inter-process communication ("IPC") channels by the virtual boards. The hypervisor 117 should ensure proper directionality of IPC channels.

The exemplary embodiments of the present invention implement these security features by using memory that is shared among virtual boards 130, 140, 150 for a data path. For example, the memory 128 may include a portion or the entirety of the memory that is a shared memory space for the virtual boards 130, 140, 150. Throughout the remainder of this description, the memory 128 may also be referred to as the shared memory space 128 and this should be understood to mean that portion of the memory 128 that is shared by the virtual boards 130, 140, 150. The shared memory data path enables a fast, zero-copying IPC between senders and receivers.

In addition, the exemplary embodiments also implement an IPC control facility in the hypervisor 117 for control path integrity. The control path may maintain the integrity of the data communicated and the synchronization between senders and receivers. The IPC control facility provides for sufficient isolation between virtual boards communicating over the shared memory space 128 in the manner to be described herein. It should be noted that while the exemplary embodiments describe the IPC control facility as being implemented in the hypervisor 117, it is also possible that the IPC control facility may be implemented as a separate component (hardware and/or software) from the hypervisor 117.

The shared memory space 128 may be broken into a plurality of blocks, each of which may be of a size that is a multiple of the standard memory management unit ("MMU") page size. These blocks may comprise the standard unit of data for IPC-controlled communications. At any point, a block may be in one of two states. A block may be a "free block," meaning that it contains no data and may be used by a sending virtual board to send data. Alternately, a block may be a "data block," meaning that it contains data that has been written to it by a sending virtual board for consumption by one or more receiving virtual boards. When a virtual board is acting as a receiver, all blocks may always be marked with read-only MMU attributes or map only the "data blocks" in read-only fashion, with the "free blocks" being unmapped. When a virtual board is acting as a sender, free blocks may be marked with read-write MMU attributes, while data blocks may be marked with read-only MMU attributes or remain unmapped. Those skilled in the art will understand that each of the virtual boards 130, 140 and 150 may be capable of acting either as a sender or a receiver, depending on required functionality.

Figure 2:
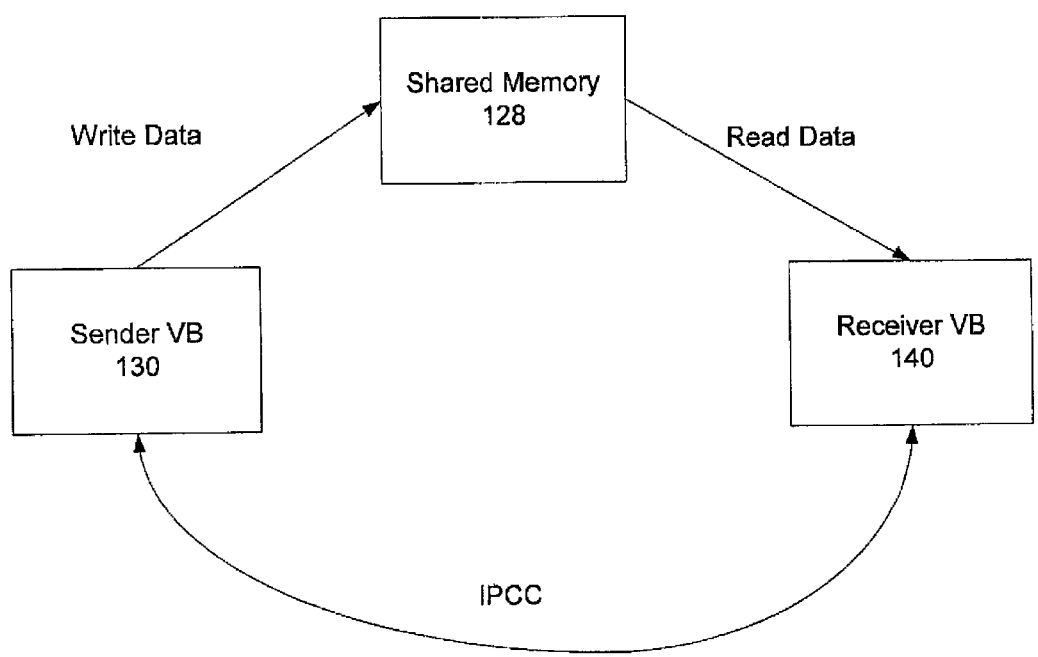
FIG. 2 is a block diagram illustrating an exemplary communication between virtual boards according to an exemplary embodiment of the present invention.
Figure 3:
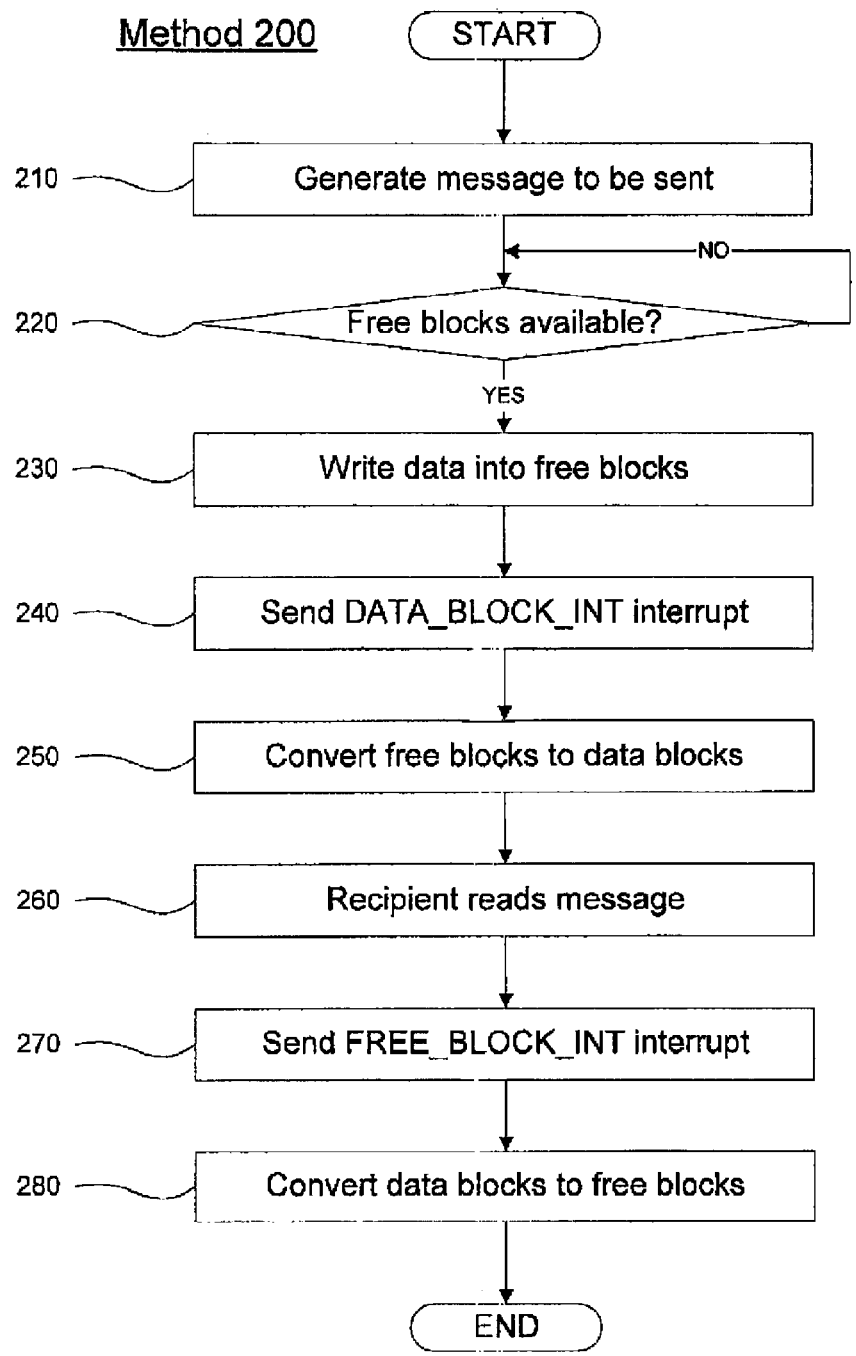
FIG. 3 shows an exemplary method for sending a unicast message between virtual boards according to the present invention.

FIG. 2 is a block diagram illustrating an exemplary communication between the virtual board 130 and the virtual board 140 using the shared memory 128. FIG. 3 illustrates an exemplary method 200 for communicating between virtual boards. The exemplary method 200 will be described with reference to the exemplary block diagram of FIG. 2, e.g., a communication between virtual board 130 and virtual board 140. Those skilled in the art will understand that similar processes may occur involving other virtual boards. FIG. 3 illustrates an exemplary method whereby a single virtual board 130 sends a message to a single virtual board 140, i.e., a unicast message. A multicast message (i.e., the process whereby one virtual board may send a message to a plurality of virtual boards) may also be possible and will be discussed below with reference to FIG. 4.

As those of skill in the art will understand, a "port" is the endpoint in a partition through which data flows into or out of the partition. A port may be of three types: a sender port, a receiver port, or a sender/receiver port. Referring to the above, a unicast channel connects two ports where the sender partition has either a sender port or a sender/receiver port, and the receiver partition has either a receiver port or a sender/receiver port. As stated, the exemplary method 200 of FIG. 3 illustrates a process for sending a unicast messages; those of skill in the art will understand that multiple unicast channels may be connected to one another to form a zero-copy data transfer and/or time transfer among a set of partitions that process data in a pipelined fashion. For example, if the virtual board 130 and the virtual board 140 are connected through a first channel, and the virtual board 140 and the virtual board 150 are connected through a second channel, a pipeline data transfer and/or time transfer can pass data and/or time from virtual board 130 to virtual board 140 and then directly to virtual board 150.

In step 210, virtual board 130 generates data to be sent to virtual board 140; the data generated may depend on the functions of the virtual boards 130 and 140, and the performance of the exemplary method 200 is independent of the specific nature of the data to be transmitted. In step 220, the sending virtual board 130 determines whether there are free blocks within the shared memory area 128 within which to write data. If not, the message is queued and the virtual board 130 waits until there is suitable free space to write the message (e.g., repeats step 220). If there are available free blocks within the shared memory 128, the method proceeds to step 230, wherein the sending virtual board 130, which has read-write access to free blocks, writes data to be transmitted to virtual board 140 in the free blocks of the shared memory area 128.

Subsequently, in step 240, the sending virtual board 130 sends an interrupt (referred to herein as "DATA_BLOCK_INT") to the hypervisor 117 and notifies it of the message pending for the recipient virtual board 140. A DATA_BLOCK_INT interrupt may contain the start offset of the data block within the shared memory 128 where the message begins, as well as the number of contiguous data blocks occupied by the message. In response to this interrupt, in step 250 the hypervisor 117 converts the status of the designated blocks from free blocks to data blocks, thereby changing the access the sender has to them from read-write to read-only or unmapped. The DATA_BLOCK_INT interrupt is also sent to the receiving virtual board 140, which may read the message contained within the data blocks of the shared memory 128 in step 260. The receiving virtual board 140 may know where to look for the message because of the location data contained within the DATA_BLOCK_INT.

Once the receiver board 140 has read the portion of the shared memory 128 that contains the message sent by virtual board 130, the receiver board 140 generates a reply interrupt FREE_BLOCK_INT in step 270. Similar to the DATA_BLOCK_INT interrupt, the FREE_BLOCK_INT interrupt is sent to the hypervisor 117. The purpose of the FREE_BLOCK_INT interrupt is to inform the hypervisor 117 that a message has been read and request that the blocks containing the message be converted back from data blocks to free blocks. The FREE_BLOCK_INT interrupt identifies the location of blocks to be freed in the same manner as the DATA_BLOCK_INT interrupt (e.g., by identifying a start offset of the first block within the shared memory space 128 and the number of blocks occupied by the message).

Upon receiving the FREE_BLOCK_INT interrupt, in step 280 the hypervisor 117 may convert the identified data blocks to free blocks so that they may then be used to send future messages. The FREE_BLOCK_INT interrupt is also received by the sending virtual board 130, which is thus made aware that the identified blocks will be freed for use in the sending of future messages. Following step 280, the method terminates.

For both DATA_BLOCK_INT and FREE_BLOCK_INT interrupts, multiple pending instances of the same interrupt type may be queued and delivered in the order that they were generated. This enables queuing of requests as described above. Because senders (e.g., sending virtual board 130) have read-only access or no access to data blocks, they are prevented from tampering with data once it has been sent. Read-write access to blocks within the shared memory space 128 is restored only once the FREE_BLOCK_INT interrupt has been used and blocks have once again become free blocks. Because the exemplary embodiments of the present invention provide for all virtual boards (e.g., virtual boards 130, 140 and 150) to have read access to both free blocks and data blocks, virtual boards that are sending messages (e.g., virtual board 130) will be aware that distrusted receivers are capable of reading transient data as it is being written into a free block, and may adjust their behavior accordingly.

The exemplary method 200 may also enable the sending virtual board 130 to donate some or all of its processing time to the receiving virtual board 140. This may be useful for systems in which multiple virtual boards share limited processing resources. In such cases, the amount of time to be donated may be part of the payload of the DATA_BLOCK_INT interrupt; thus, the receiver may be notified of the time donation. Once the interrupt has been sent, the sender may remain blocked until either the receiver relinquishes control (e.g., via a FREE_BLOCK_INT interrupt) or the donated time period expires. If the receiver of such a processing time donation (e.g., virtual board 140) does not require the received time, it in turn may donate the time to a subsequent recipient (e.g., virtual board 150) using the same mechanism as described above. A virtual board may be configured to accept time donations serially or concurrently from multiple senders. The hypervisor 117 may or may not monitor the use a recipient makes of processing time that has been donated to it.

Figure 4:
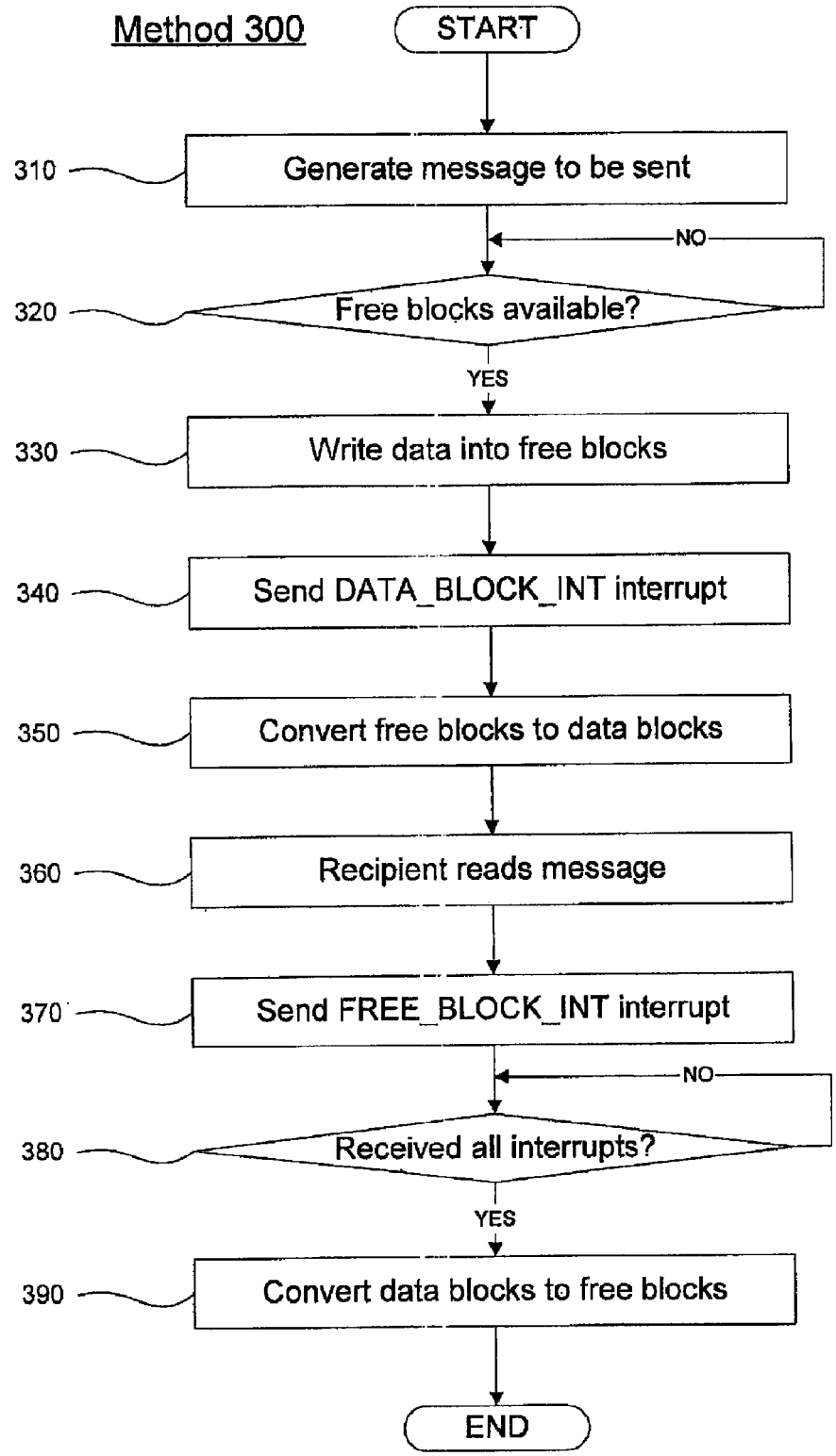
FIG. 4 shows an exemplary method for sending a multicast message between virtual boards according to the present invention.

As discussed above, other embodiments of the present invention may support multicast transmission of data from a single sender to multiple receivers. FIG. 4 illustrates one such exemplary method 300 for doing so. The method 300 begins in much the same way as the exemplary method 200 described above. Steps 310, 320 and 330, wherein the sending virtual board 130 generates a message for transmission, determines whether enough free blocks are available to write the message, and, if so, writes the data into those free blocks, are substantially identical to steps 210, 220, and 230 of exemplary method 200.

In step 340, as in step 240, the sending virtual board 130 generates a DATA_BLOCK_INT interrupt. However, in order to accomplish a multicast transmission, rather than sending the DATA_BLOCK_INT interrupt to the hypervisor 117 and to a single receiver board 140, the interrupt is sent to the hypervisor 117 and a plurality of receiver boards (e.g., virtual boards 140 and 150). Other than the addition of a recipient, the nature of the interrupt is substantially similar to that described above with reference to step 240. In step 350, the hypervisor 117 converts the designated free blocks to data blocks as described above with reference to step 250. In step 360, the receiver boards 140 and 150 read the message contained in the designated blocks in the same manner described above with reference to step 260.

In step 370, the receiver boards 140 and 150 send FREE_BLOCK_INT interrupts to the hypervisor 117 in the manner described above with reference to step 270. In step 380, the hypervisor 117 determines whether it has received FREE_BLOCK_INT interrupts from all receiver boards 140 and 150 that were recipients of the identified data blocks. If not, the hypervisor 117 may continue waiting for interrupts and periodically determining whether it has received them from all recipients (e.g., repeats step 380). If the hypervisor 117 has received interrupts from all recipients, in step 390 it converts all identified blocks within the shared memory space 128 from data blocks to free blocks in the manner described above with reference to step 280. Following step 390, the method terminates.

The exemplary embodiments of the present invention provide for a communication mechanism that possesses a small footprint both within the hypervisor and within the memory space of the system. Memory space required for messages may merely be that required to contain the messages, and may be customizable depending on the nature of the messages that must be carried. The hypervisor is not required to transmit the messages themselves, merely receive and respond to interrupts, thus the size of the hypervisor is not greatly increased. Further, because messages are not actually "transmitted" from one virtual board to another, but are rather written and read directly in the same location, messages may be sent extremely quickly.

Those skilled in the art will understand that the above-described exemplary embodiments may be implemented in any number of manners, including as a separate software module, as a combination of hardware and software, etc. For example, the hypervisor 117 may be a program containing lines of code that, when compiled, may be executed by a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A method, comprising:
    managing the process of switching between a plurality of independent tasks;
    receiving an interrupt from a sender and a first notification of a pending message;
    converting blocks of memory from free blocks to data blocks;
    receiving at least one further interrupt from a plurality of receivers and at least one further notification of that the pending message has been read;
    converting the data blocks back to free blocks; and
    designating the blocks of memory as free blocks after the at least one further interrupt has been received, wherein the designating occurs after each of the further interrupts are received from all of the plurality of receivers.

2. The method of claim 1, further comprising:
    changing a sender access from read-write access to read-only access while the message is pending; and
    changing a sender access from read-only access back to read-write access once the pending message has been sent.

3. The method of claim 1, further comprising:
    providing, by an interprocess communication ("IPC") control facility, control access to a plurality of IPC channels by at least one of the sender and the receiver.

4. The method of claim 1, wherein the plurality of independent tasks are run on a plurality of virtual processors, wherein each virtual processor includes at least one virtual board connected via a corresponding channel.

5. The method of claim 4, wherein the method is performed by a hypervisor providing integrity against faulty data in any one of the plurality of virtual boards.

6. The method of claim 1, further comprising:
    monitoring, by a hypervisor, the use of processing time by at least one of the sender and the plurality of receivers.

7. The method of claim 1, wherein the message is directed to a plurality of recipients as a multicast transmission.

8. The method of claim 3, wherein the IPC control facility ensures proper directionality along the IPC channels.

9. The method of claim 3, wherein the IPC control facility controls path integrity for data transmission and synchronization between the sender and the plurality of receivers.

10. The method of claim 3, wherein the IPC control facility is an integrated component of the hypervisor.

11. The method of claim 4, wherein the IPC control facility provides isolation between the virtual boards.

12. A system, comprising:
    a hypervisor managing the process of switching between a plurality of independent tasks, receiving an interrupt from a sender and a first notification of a pending message, converting blocks of memory from free blocks to data blocks, receiving at least one further interrupt from a plurality of receivers and at least one further notification of that the pending message has been read, converting the data blocks back to free blocks, and designating the blocks of memory as free blocks after the at least one further interrupt has been received, wherein the designating occurs after each of the further interrupts are received from all of the plurality of receivers; and
    a IPC control facility providing for control access to IPC channels by boards.

13. The system of claim 12, wherein the hypervisor changes a sender access from read-write access to read-only access while the message is pending, and changes a sender access from read-only access back to read-write access once the pending message has been sent.

14. The system of claim 12, wherein the plurality of independent tasks are run on a plurality of virtual processors, wherein each virtual processor includes at least one virtual board connected via a corresponding channel.

15. The system of claim 12, wherein the hypervisor monitors use of processing time by at least one of the sender and the plurality of receivers.

16. The system of claim 12, wherein the message is directed to a plurality of recipients as a multicast transmission.

17. The system of claim 12, wherein the IPC control facility ensures proper directionality along the IPC channels.

18. The system of claim 12, wherein the IPC control facility controls path integrity for data transmission and synchronization between the sender and the plurality of receivers.

19. The system of claim 14, wherein the IPC control facility provides isolation between the virtual boards.

20. A memory storing a set of instructions and a processor executing the instructions, the instructions being operable to:
    manage the process of switching between a plurality of independent tasks;
    receive an interrupt from a sender and a first notification of a pending message;
    convert blocks of memory from free blocks to data blocks;
    receive at least one further interrupt from a plurality of receivers and at least one further notification of that the pending message has been read;
    convert the data blocks back to free blocks;
    provide for control access to IPC channels by boards; and
    designate the blocks of memory as free blocks after the at least one further interrupt has been received, wherein the designating occurs after each of the further interrupts are received from all of the plurality of receivers.

* * * * *